United States Patent [19]

Valdivia

[11] Patent Number: 4,813,549

[45] Date of Patent: Mar. 21, 1989

[54] BICYCLE FORK PROTECTION AND STABILIZING DEVICE

[76] Inventor: Richard Valdivia, 245 Market St., Apt. #B, Venice, Calif. 90291

[21] Appl. No.: 72,970

[22] Filed: Jul. 14, 1987

[51] Int. Cl.[4] ............................................. A47F 7/00
[52] U.S. Cl. .................................................... 211/17
[58] Field of Search ......................... 211/17, 22, 20, 5; 248/346.1, 346

[56] References Cited

U.S. PATENT DOCUMENTS

| | | | |
|---|---|---|---|
| 2,633,248 | 3/1953 | Goldenberg | 248/346.1 X |
| 2,844,909 | 7/1958 | Perchinsky | 248/346.1 |
| 3,138,893 | 6/1964 | Rupar | 248/346.1 |
| 3,942,646 | 3/1976 | Nelson et al. | 211/20 X |
| 4,050,583 | 9/1977 | Szabo | 211/20 |
| 4,474,387 | 10/1984 | Maranell et al. | 248/346 X |

FOREIGN PATENT DOCUMENTS 2850763  5/1979  Fed. Rep. of Germany ........ 211/22

Primary Examiner—Robert W. Gibson, Jr.
Attorney, Agent, or Firm—Poms, Smith, Lande & Rose

[57] ABSTRACT

Disclosed herein is a bicycle fork protection and stability device to be used in conjunction with a bicycle frame and rear wheel when the front wheel is removed (by use of a quick release mechanism). In the situations when the front wheel is removed, in order to provide protection to the bicycle axle forks on the forward main bicycle fork, as well as stability to the remaining frame, bicycle axle fork-receiving shoes are mounted to accommodate the reception of each of the forward axle fingers the axle forks of the bicycle. An upper compartment is defined in the shoe to accommodate the axle fork, while a lower under surface has a relatively skid resistant material with a high coefficient of friction to enhance stability. The shoes function as a bicycle stand for those situations in which the owner of the bicycle wishes to park his bicycle with the front forward wheel removed.

8 Claims, 1 Drawing Sheet

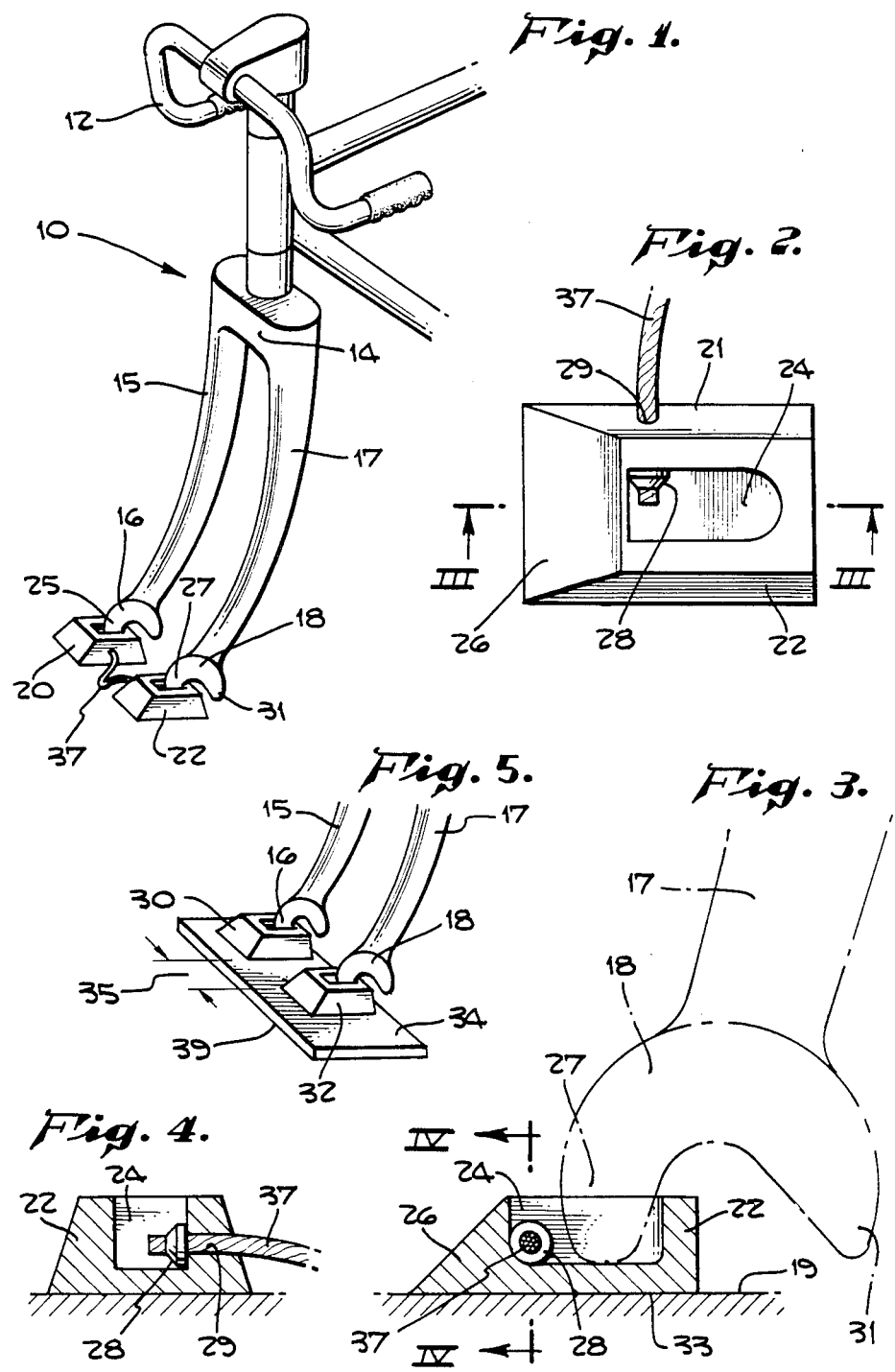

BICYCLE FORK PROTECTION AND STABILIZING DEVICE

FIELD OF THE INVENTION

This invention relates to bicycles; and, more particularly to a device for protecting the front bicycle fork and enhancing the stability of the bicycle, when the front wheel is removed.

BACKGROUND OF THE INVENTION

As the world becomes more health conscious, the role of exercise in producing a healthy body is increasingly documented by medical reports and studies. Bicycle riding has become a popular alternative to running or jogging as a means for achieving good aerobic exercise.

As both bike racing enthusiasts as well as casual bikers continually search for new terrain to explore, the portability of a bicycle has become increasingly important. In order to achieve portability, modern day bicycles are equipped with quick release mechanisms, especially on the front tire. When the front tire is removed, the bicycle may be placed in the trunk of an automobile, to allow its user to easily transport the bike to another location for a riding adventure.

Easy removability of the front tire afforded by the quick release mechanism allows easy repair of the front tire and also serves to afford the bicycle owner some additional protection from theft. For example, a bicycle owner may wish to lock his bike up at a particular outdoor location and remove the front wheel by use of the quick release mechanism. He may either take the wheel with him or lock it to the side of the bike, thereby slowing down any getaway of a would be bike thief. Thus, it appears that a quick release mechanism for bicycle front tires, although of recent origin, will become a permanent fixture on the bicycle landscape.

The existence of this clever quick release mechanism gives rise to problems unforeseen by its inventors. Among these are the fact that once one removes the front tire quickly, the owner of the bicycle is left with a front handlebar and main fork frame which is essentially denuded of the tire and axle it normally carries. A kickstand, which is normally used to support the bike in a pseudo-tripod positioning, is useless to afford stability to the remaining bicycle structure once the front wheel is removed. Furthermore, placing the axle forks directly on a cement or other hard rough surface will lead to a scratching and wearing down of the forks, and subsequent difficulty in re-mounting the wheel on the bike. Thus, the invention of the quick release front wheel mechanism has given rise to new problems of a bicycle fork protection and stability for the remaining bicycle and frame.

SUMMARY OF THE INVENTION

What is needed is a mechanism which protects each of the axle forks at the end of the main front fork blade of the bicycle when the front tire is removed by the quick release mechanism.

It is therefore an object of this invention to provide a device which both protects the bicycle axle forks at the front portion of the bicycle when the front tire is removed and also ensures the stabilization of the remaining bicycle and frame in an upright position when the front tire is removed.

In order to effectuate this and other objects which will become apparent, disclosed herein is a bicycle fork protection and stabilization device comprising a bicycle fork-receiving shoe, suitable for placement on the forward tip of each of the bicycle axle forks to both protect the forks and give stability to the bicycle. A bicycle axle fork receiving shoe has an elongated forward toe and a backside heel. The shoe defines at least one upper compartment for receiving a bicycle axle fork in an underside having a relatively high coefficient of friction to prevent the shoe from sliding. A plurality of shoes, at least one for each front bicycle axle fork, are applied to each fork so that protection of each bicycle axle forks of the main bicycle fork and stability of the remaining bicycle frames are provided. The shoes may have a side aperture for threading a shoe pair connecting lace to assure that both shoes needed to support each axle fork are not lost but tied together for ease of transport when they are not used. Each of the shoes which supports each bicycle axle fork may be mounted on a single piece or plate to provide additional balance and stability for the bicycle.

The invention may be thought of as a bicycle support system for the circumstance when the front tire of the bicycle is removed from its ordinary operational location within the main front bicycle fork. The device maintains the stability of the bicycle and the frame when the front tire is removed. The device receives and contains at least two front axle receiving forks of a bicycle. The axle fork-receiving device includes a skid resistant surface in contact with the ground, the skid resistance surface having a relatively high coefficient of friction. The axle fork receiving device also has a wide forward toe to stabilize the bicycle axle fork as the axle fork is inserted into the fork receiving device. In this manner the bicycle may be stabilized in an upright position when the wheels are removed. An opening at the upper surface of the axle fork-receiving device defines a compartment for receiving the axle fork which conforms to the forward contour of the axle fork.

In the preferred embodiment, there is provided a generally rectangularly shaped shoe with a forward pointed toe, making the overall lateral profile of the shoe that of a trapezoid. The shoe may be made from an organic polymer such as polyethylene or nylon. While this embodiment is preferred, any design which affords an upper axle-fork-receiving compartment and a forward toe which spreads outward will resist destabilization of the remaining bicycle frame and protect the axle forks which each shoe contains. This and other advantages of the invention will be apparent in the detailed description of the preferred embodiment.

BRIEF DESCRIPTION OF THE DRAWINGS

FIG. 1 shows a prospective view of a forward portion of a bicycle where having each of its front axle forks placed into the bicycle fork protection and stabilizing device of this invention.

FIG. 2 shows a top view of the bicycle axle fork receiving shoe of this invention.

FIG. 3 shows a cross sectional elevational view of the invention taken along lines III—III of FIG. 2.

FIG. 4 is cross-sectional view of the invention taken along line IV—IV of FIG. 3.

FIG. 5 is a perspective view of an alternative embodiment of this invention.

DETAILED DESCRIPTION OF THE PREFERRED EMBODIMENT

With reference to FIGS. 1 through 3, there is shown generally the forward end of a bicycle frame 10 and handlebars 12 having a main front fork 14. The main front fork 14 has, at each of its forward legs 15 and 17, axle forks 16 and 18 for receiving the axle or hub of front wheel. Axle fork 16 and axle fork 18 are shown in FIG. 1, each residing in the bicycle axle fork receiving shoes 20 and 22. The forward axle finger 25 of axle fork 16 resides in shoe 20, while the forward axle finger 27 of axle fork 18 resides in shoe 22.

In the preferred embodiment, the configuration of shoes 20 and 22 are essentially identical to ensure stability of the structure of the bike when it is placed in an upright position with the front wheel the bicycle removed. The shoes 20 and 22 also protect the forward fingers 25 and 27 of the axle forks 16 and 18.

FIGS. 2-4 show, as an example, shoe 22 which defines an upper compartment 24 and a forward toe 26. The upper compartment 24 must be large enough to accommodate forward finger 27 (FIG. 3) of the axle fork 18. Generally, the rear finger 31 of the axle fork 18 does not require independent support to achieve the goals of this invention. It will be noted that forward toe 26 extends at least an extra length beyond the length of the compartment 24. In this manner, stabilization and an anti skid function may be accomplished.

The underside 33 of the shoe 22 (abutting the street surface 19) is provided with an anti-skid surface, such as a coarse material like sandpaper or a ribbed or wavy constructed surface which will accommodate anti-skid and anti-destabilizing functions. Although the toe 26 is shown as a pointed forward directed mechanism, the front toe 26 could easily be circular or some other shape which extends forward in order to accommodate the anti-skid function. The shoe may be preferably manufactured by molding from any organic polymer such as nylon or polyethylene.

For ease of transporting the bicycle fork protection and stabilization device of this invention, an aperture 29 (FIG. 2 and 4) may be placed on the side 21 of the shoe 22 to allow the insertion of a shoe lace 37, so that more than one shoe may be tied together for ease of transport when the shoes are not in use. The shoe lace 37 may be may be secured within the shoe 22 by the retaining cap 28.

Turning now to FIG. 5, an alternative embodiment of the disclosed invention is shown. Shoes 30 and 32 are mounted on a single piece board or plate 34 to provide additional stability to the remaining bicycle structure as it is supported. The distance 35 between the shoes 30 and 32 is essentially equivalent to the distance between the facing sides of axle forks 16 and 18. In such an embodiment the underside 39 of the board 34 would have a high coefficient of friction to prevent sliding of the board 34.

While a preferred and an alternative embodiment have been disclosed which detail and teach the invention disclosed herein, alternative embodiments to those specifically disclosed, but equivalent to those disclosed embodiments are intended to be comprehended within the appended claims.

What is claimed is:

1. In a bicycle support system, wherein a front bicycle tire is removed from the main front bicycle fork, a device for maintaining the stability of a bicycle and frame when said front tire is removed, comprising:
   means for receiving and supporting at least two front axle-receiving forks of a bicycle;
   said axle-fork-receiving means further comprising:
   a skid-resistant surface in contact with the ground, said skid-resistant surface having a relatively high coefficient of friction;
   a wide forward toe to stabilize the bicycle axle fork as it is inserted into said fork receiving means; and,
   said axle fork receiving means being formed of a tough, yieldable material;
   whereby, said bicycle may be stabilized upright when its wheels are removed and protected from damage by scraping on cement or the like.

2. In a bicycle support system, wherein a front bicycle tire is removed from the main front bicycle fork, a device for maintaining the stability of a bicycle and frame when said front tire is removed, comprising:
   means for receiving and supporting at least two front axle-receiving forks of a bicycle;
   said axle-fork-receiving means further comprising:
   a skid-resistance surface in contact with the ground, said skid-resistant surface having a relatively high coefficient of friction;
   a wide forward toe to stabilize the bicycle axle fork as it is inserted into said fork receiving means;
   at least two of said axle fork-receiving means being mounted on a single plate, a pre-determined distance apart, providing enhanced stability and protection for the bicycle and the main front fork; and,
   whereby, said bicycle may be stabilized upright when its wheels are removed and protected from damage by scraping on cement or the like.

3. In a bicycle support system, wherein a front bicycle tire is removed from the main front bicycle fork, a device for maintaining the stability of a bicycle and frame when said front tire is removed, comprising:
   means for receiving and supporting at least two front axle-receiving forks of a bicycle;
   said axle-fork-receiving means further comprising:
   a skid-resistant surface in contact with the ground, said skid-resistant surface having a relatively high coefficient of friction;
   a wide forward toe to stabilize the bicycle axle fork as it is inserted into said fork receiving means; and,
   an aperture that is defined along a side of said axle fork-receiving means;
   said aperture allowing a connecting lace to be threaded therethrough;
   said connecting lace adaptable for linking two or more axle fork-receiving means; and
   whereby, said bicycle may be stabilized upright when its wheels are removed and protected from damage by scraping on cement or the like.

4. A bicycle fork protection and stabilizing device, comprising:
   a bicycle axle fork-receiving shoe, said shoe having an elongated forward toe and a backside heel;
   said shoe defining at least one upper compartment for receiving a bicycle axle fork;
   an underside having a relatively high coefficient of friction to prevent the shoe from sliding;
   a pair of said shoes, one for each front bicycle axle fork, applied to each fork providing stability and protection for said bicycle fork;
   each of the shoes mounted on a single plate to provide balance and stability for a bicycle; and, said single plate having an underside which has a high coefficient for friction to prevent the pair of shoes from sliding.

5. A bicycle fork protection and stabilizing device, comprising:

a bicycle axle fork-receiving shoe, said shoe having an elongated forward toe and backside heel;

said shoe defining at least one upper compartment for receiving a bicycle axle fork;

an underside having a relatively high coefficient of friction to prevent the hose from sliding; and said device including a pair of shoes, one for each front bicycle axle fork, for application to each fork providing stability and protection for said bicycle fork.

6. The device for maintaining the stability of a bicycle of claim 1, wherein said axle fork-receiving means includes:

an opening at an upper surface of said axle fork-receiving means;

said opening defining a compartment for receiving said axle fork which conforms to a forward contour of said axle fork.

7. The device of the bicycle support system of claim 1, wherein said axle fork receiving means is made from an organic polymer material selected from the group consisting of nylon and polyethylene.

8. The bicycle fork protection and stabilizing device of claim 5, said shoe is made from an organic polymer material selected from the group consisting of nylon and polyethylene.

* * * * *